(12) United States Patent
George et al.

(10) Patent No.: US 8,136,978 B2
(45) Date of Patent: Mar. 20, 2012

(54) TUMBLER WITH STIRRING ASSEMBLY

(75) Inventors: Sarah Danger George, Seattle, WA (US); Tyler Sean Gilbert, Bellevue, WA (US)

(73) Assignee: Pacific Market International, LLC, Seattle, WA (US)

( * ) Notice: Subject to any disclaimer, the term of this patent is extended or adjusted under 35 U.S.C. 154(b) by 416 days.

(21) Appl. No.: 12/473,132

(22) Filed: May 27, 2009

(65) Prior Publication Data
US 2010/0302897 A1 Dec. 2, 2010

(51) Int. Cl.
*B01F 13/00* (2006.01)
*B01F 7/20* (2006.01)
(52) U.S. Cl. ......... 366/130; 366/244; 366/252; 366/247
(58) Field of Classification Search .................. 366/244, 366/245, 246, 247, 252, 130
See application file for complete search history.

(56) References Cited

U.S. PATENT DOCUMENTS

| | | | |
|---|---|---|---|
| 2,247,708 A * | 7/1941 | Jordan | 310/83 |
| 2,719,703 A * | 10/1955 | Boakes | 366/244 |
| 2,831,663 A * | 4/1958 | Nauta | 366/287 |
| 3,940,115 A * | 2/1976 | Zipperer | 366/303 |
| 4,813,785 A * | 3/1989 | Miller | 366/251 |
| 4,854,718 A * | 8/1989 | Wang | 366/252 |
| 5,407,270 A * | 4/1995 | Barile et al. | 366/247 |
| 6,283,625 B2 * | 9/2001 | Frankel et al. | 366/146 |
| 6,641,298 B2 * | 11/2003 | Safont et al. | 366/247 |
| 6,702,455 B2 * | 3/2004 | Vendrely et al. | 366/130 |
| 6,719,451 B1 * | 4/2004 | Yue | 366/130 |
| 6,886,707 B2 * | 5/2005 | Giraud | 220/254.4 |
| 6,921,192 B2 * | 7/2005 | Vendrely et al. | 366/139 |
| 7,685,933 B2 * | 3/2010 | Fevre | 99/348 |
| 2006/0087912 A1 * | 4/2006 | Tague et al. | 366/139 |
| 2007/0056447 A1 * | 3/2007 | Swartz et al. | 99/287 |

* cited by examiner

*Primary Examiner* — Joseph Del Sole
*Assistant Examiner* — Nahida Sultana
(74) *Attorney, Agent, or Firm* — David Wright Tremaine LLP; George C. Rondeau, Jr.

(57) ABSTRACT

A container having a removable lid, a hollow interior for storing contents, and a stirring assembly. The stirring assembly includes a rotatable wheel mounted to an outside portion of the removable lid and a shaft extending into the hollow interior of the container. The rotatable wheel is manually rotatable about a first axis of rotation. The shaft is rotatable by the wheel. When the wheel is rotated about the first axis of rotation, the wheel rotates the shaft about a second axis of rotation. At least one paddle extends outwardly from the shaft into the hollow interior of the container and stirs or agitates the contents of the container when the rotation of the shaft about the second axis of rotation rotates the at least one paddle inside the hollow interior of the container.

20 Claims, 13 Drawing Sheets

TUMBLER WITH STIRRING ASSEMBLY

BACKGROUND OF THE INVENTION

1. Field of the Invention

The present invention is directed generally to a food and/or beverage container for storing liquid or semi-liquid contents and more particularly to a food and/or beverage container having a stirring mechanism for stirring or agitating the contents of the container.

2. Description of the Related Art

Many people enjoy foods and/or beverages are created from two or more separate components stirred or mixed together. For example, many people enjoy coffee drinks (such as a café mocha) including two or more components (e.g., espresso, steamed milk, and chocolate syrup) stirred or mixed together. The quality and enjoyability of such drinks depend upon how well the components are stirred or mixed together. Occasionally, such foods and/or beverages separate over time into two or more components may be reintegrated by stirring. Further, foods and/or beverages that include a particulate component suspended in a liquid component may experience settling in which the particulate component settles out of the liquid component. The enjoyability of beverages having components that have separated or settled may be improved through stirring, which will reintegrate separated components and re-suspend the particulate component in the liquid component.

Hot chocolate typically includes a particulate component (e.g., shaved chocolate or cocoa powder) suspended in a liquid component (e.g., hot water or milk) through stirring or agitation. Thus, hot chocolate is formed from two or more separate components stirred together. Further, because hot chocolate includes two or more components that may separate and a particulate component that may settle to the bottom of a drinking vessel, users may wish to stir hot chocolate occasionally.

Unfortunately, stirring a beverage can be problematic particularly when the beverage is in a vessel with a lid or the user is engaged in other activities (such as driving). To stir a beverage in a vessel with a lid, the lid must typically be removed from the vessel. This is not always practical and may result in the beverage being spilled. This is a particular concern when the user is engaged in an activity such as walking or driving. If the beverage is hot (e.g., near boiling), the user could be injured by the spilled hot liquid. Further, if the beverage is heated, removing the lid causes heat trapped in the vessel to escape, thereby cooling of the heated beverage faster than may be desired.

Therefore, a need exists for a container in which a beverage may be stirred without opening the container. The present application provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
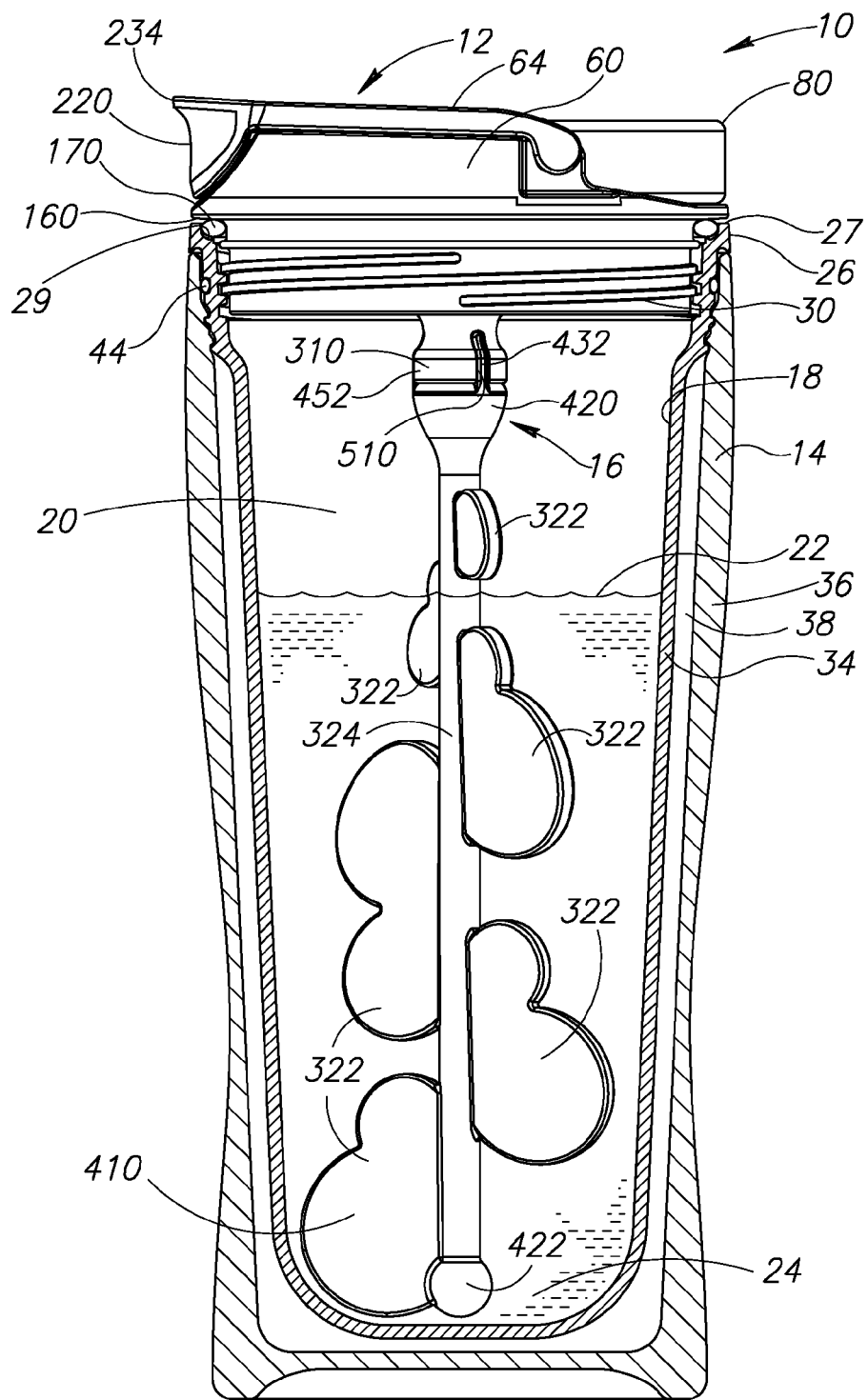
FIG. 1 is a side partial cross-sectional view of an exemplary embodiment of a container constructed in accordance with the present invention.
Figure 2:
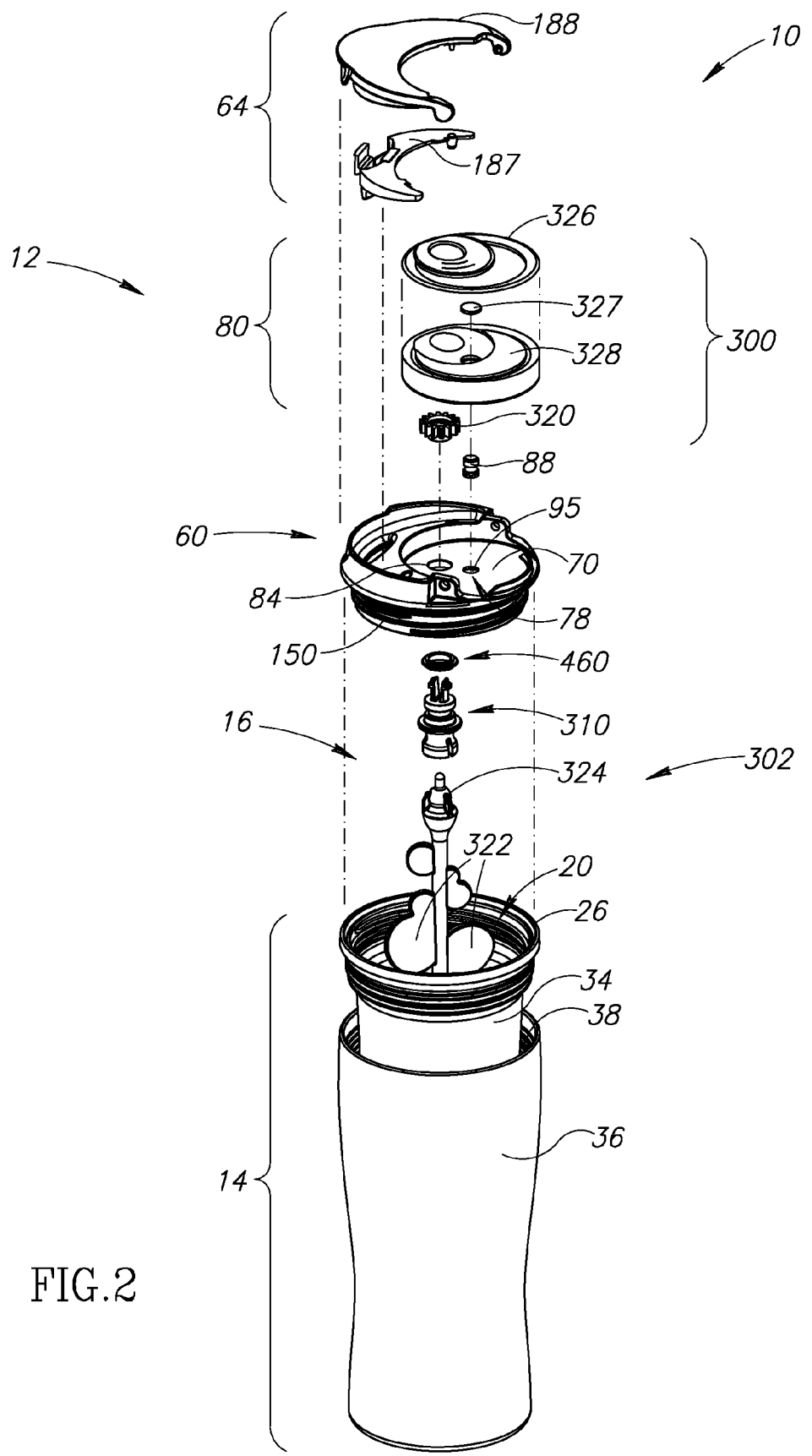
FIG. 2 is an exploded view of the container of FIG. 1.

Referring to FIGS. 1 and 2, aspects of the present invention include a beverage or food container 10 for use as a tumbler, cup, mug, bottle, thermos, decanter, or similar storage vessel. The container 10 may be reusable or disposable. For ease of illustration, the container 10 is described and illustrated as positioned in an upright orientation. However, those of ordinary skill in the art appreciate that during use, the container 10 may be positioned in any orientation. Therefore, terms that relate to directions, such as top, bottom, upward, downward, and the like, have been assigned arbitrarily and are not intended to limit the invention. The container 10 includes an open-end substantially hollow vessel 14, a lid 12, and a stirring assembly 16.

Vessel

FIG. 1 provides a side view of the container 10 with the vessel 14 sectioned longitudinally along a vertical plane to provide a cross-sectional view of the vessel 14. The vessel 14 has an inside surface 18 defining a hollow interior portion 20 for storing contents 22 that may be liquid and/or semi-liquid. Non-limiting examples of liquid or semi-liquid contents stored by the container include beverages (hot chocolate, coffee, coffee drinks, etc.), soups, and the like. The vessel 14 may be constructed from opaque materials, semi-transparent materials, transparent materials, and a combination thereof, all of which are within the scope of the present invention.

The hollow interior portion 20 has a bottom portion 24. If the contents 22 include particulate components held in suspension in a liquid component, the particulate components of the contents 22 may settle from the liquid component and reside at or near the bottom portion 24. Some of the settled particulate components may rest upon a portion of the inside surface 18 adjacent the bottom portion 24 of the hollow interior portion 20 of the vessel 14. The user may operate the stirring assembly 16 to agitate the contents 22 to re-suspend the settled particulate components in the liquid component.

Figure 3:
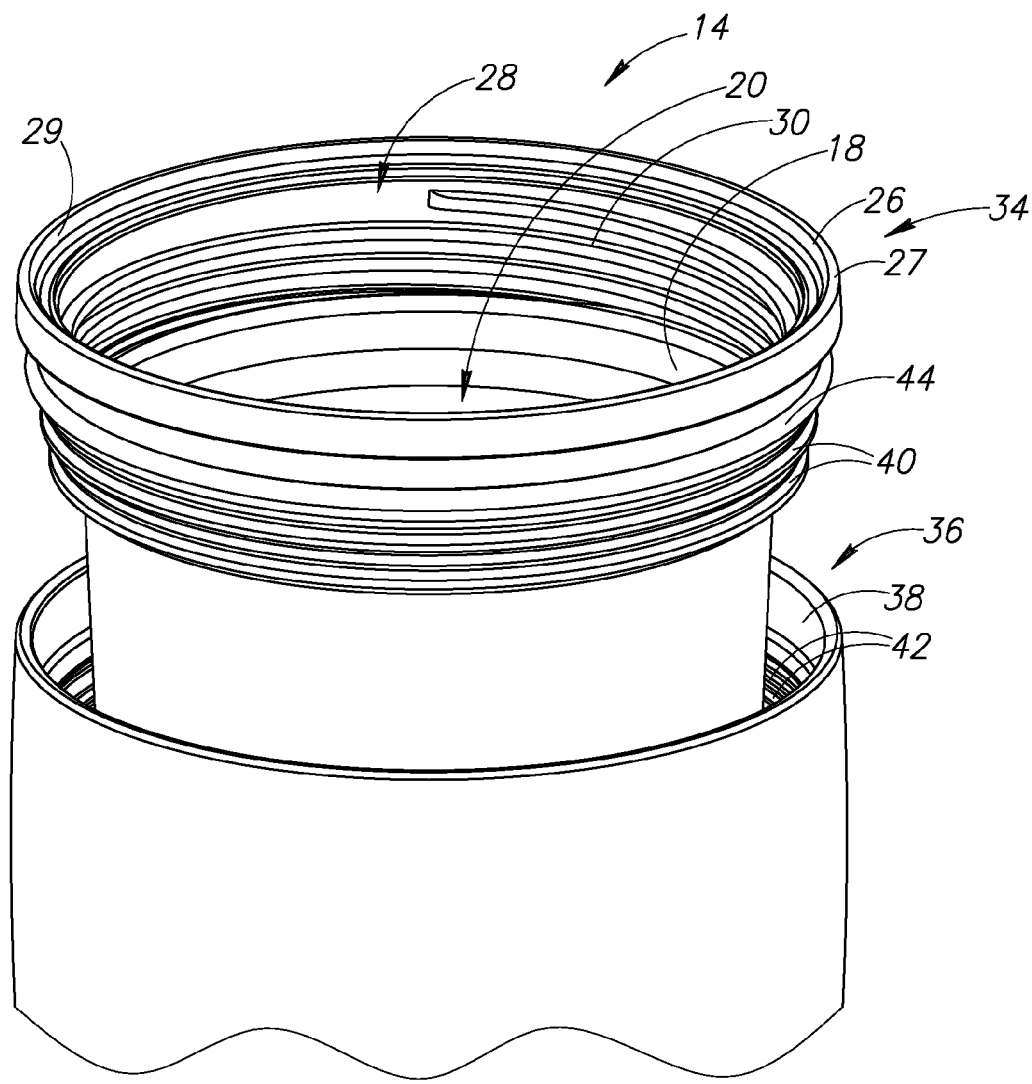
FIG. 3 is an exploded enlarged fragmentary view of a vessel of the container of FIG. 1.

As may be viewed in FIG. 3, the vessel 14 has a rim portion 26 having an upper edge portion 27 and defining an upper opening or outlet 28 in the hollow interior portion 20 through which the contents 22 (see FIG. 1) may pass to enter and exit the vessel 14. A groove 29 adjacent to the inside surface 18 may be formed along the upper edge portion 27. In the embodiment depicted in the figures, the rim portion 26 includes inside threads 30 formed on the inside surface 18.

The vessel 14 may be constructed from an inner shell 34 nested inside an outer shell 36 with an insulating air gap 38 defined between the inner and outer shells 34 and 36. In the embodiment illustrated, the inner shell 34 includes radially outwardly extending annular projections 40 configured to snap into corresponding recessed portions 42 formed in the inner shell 36. When the projections 40 are snapped into the recessed portions 42, the engagement between the projections 40 and recessed portions 42 of the inner and outer shells 34 and 36, respectively, couple the inner shell 34 inside the inner shell 36.

While a snap fit arrangement has been disclosed, any method known in the art may be used to couple the inner and outer shells 34 and 36 together. For example, the inner shell 34 may include outside threads configured to thread into inside threads disposed on the outer shell 36. Further, the inner shell 34 may be removably or permanently coupled to the inner shell 36. For example, the inner shell 34 may be glued permanently inside the outer shell 36 with an adhesive. The invention is not limited by the method used to couple the inner and outer shells 34 and 36 together. Optionally, an annular sealing member 44 may be disposed between the inner and outer shells 34 and 36 to form a liquid tight seal therebetween.

The vessel 14 need not be constructed from a separate inner shell nested inside a separate outer shell. Instead, the vessel 14 may be constructed from a single or unitary shell. As is apparent to those of ordinary skill in the art, the invention is not limited by the method used to construct the vessel 14.

Lid

Figure 4:
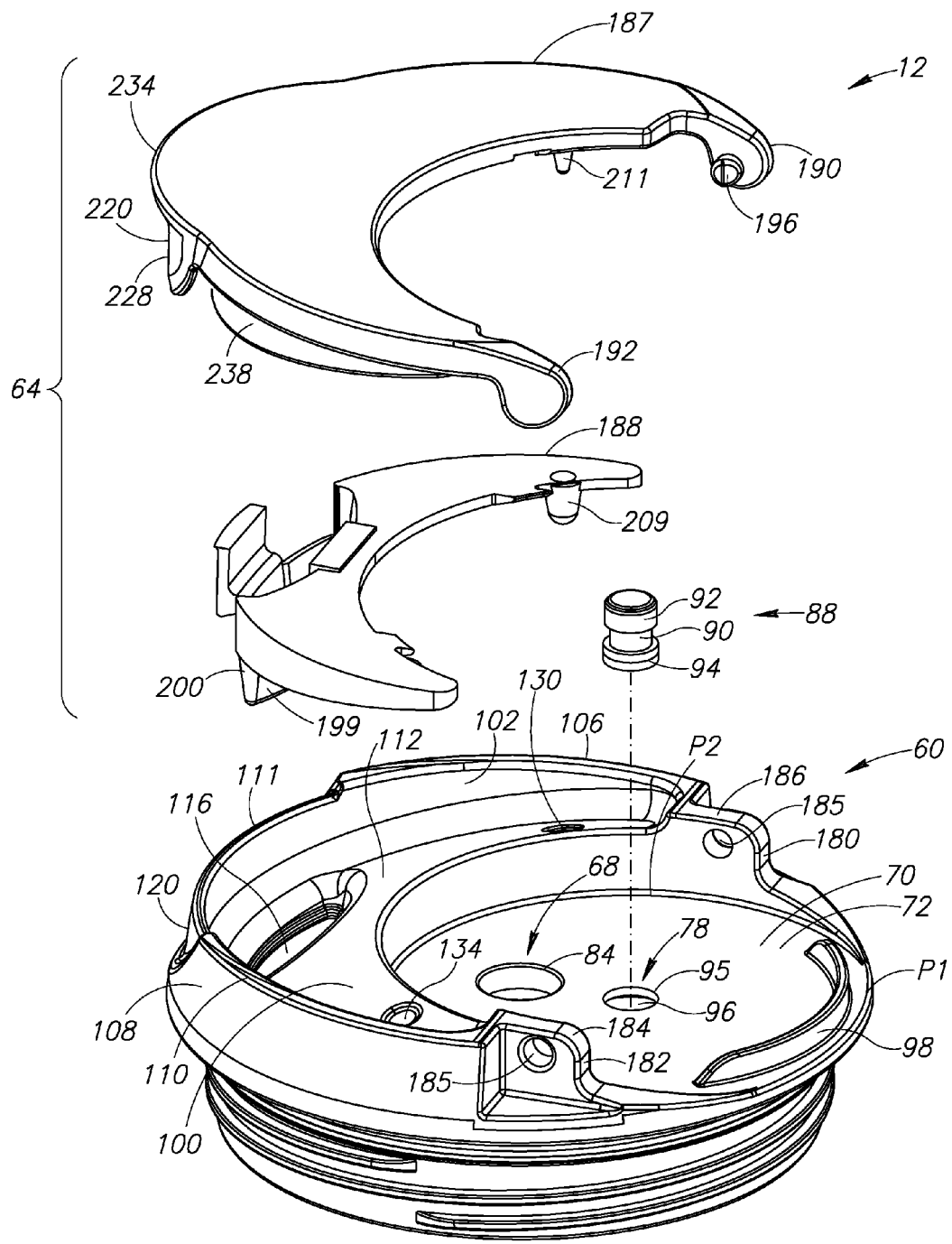
FIG. 4 is an exploded view of the lid and axle of the container of FIG. 1.

Referring to FIG. 4, the lid 12 includes two components: a lid body 60, and a movable cover portion 64. The movable cover portion 64 is selectively positionable in an open position (illustrated in FIG. 5) and a closed position (illustrated in FIGS. 1 and 6-9) relative to the lid body 60. The lid body 60 has a generally circular cross-sectional shape and a perimeter portion "P1" disposed about a central portion 68.

The lid body 60 includes an off-center support platform portion 70 with an upper surface 72 and a lower surface 74 (see FIG. 6) opposite the upper surface 72. The support platform portion 70 may have a generally circular shape and a perimeter portion "P2" disposed about a central portion 78. However, this is not a requirement. As will be described in detail below, the support platform portion 70 need only provide adequate space for a manually operated wheel 80 (see FIGS. 1 and 2) of the stirring assembly 16 (see FIGS. 1 and 2) which is rotatable relative to the lid 12.

A portion of the support platform portion 70 extends into the central portion 68 of the lid body 60. A through-hole 84 is formed in the portion of the support platform portion 70 extending into the central portion 68 of the lid body 60. In other words, the through-hole 84 is formed in the central portion 68 of the lid body 60.

Figure 7:
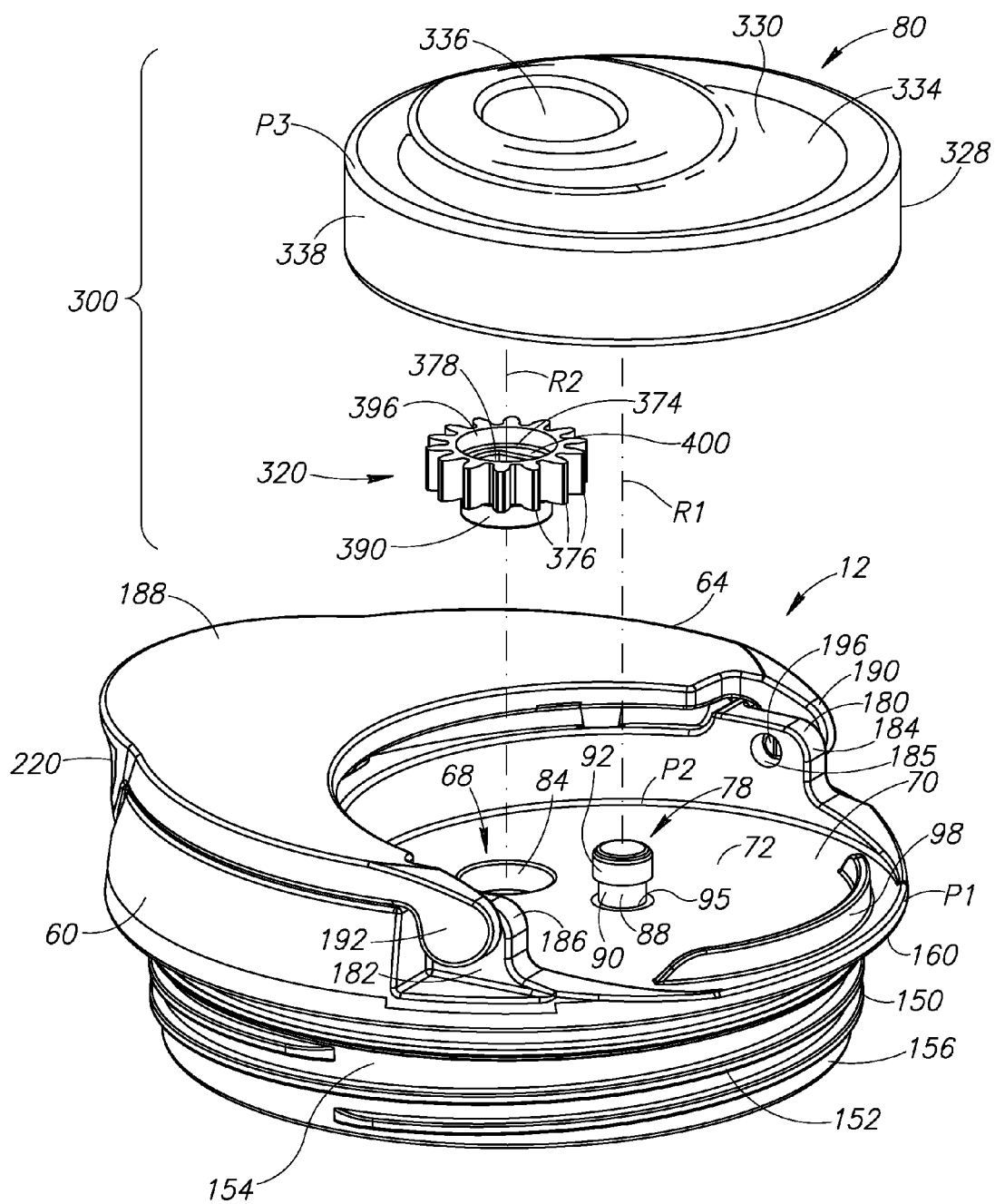
FIG. 7 is a partially exploded perspective view of the lid and external components of the stirring assembly as viewed from above the lid.

Turning to FIG. 7, the wheel 80 of the stirring assembly 16 (see FIGS. 1 and 2) rotates on an axle 88 that extends upwardly from the central portion 78 of the support platform portion 70 of the lid body 60. The axle 88 defines a rotational axis "R1" about which the wheel 80 rotates. The axle 88 is spaced from the through-hole 84 formed in the support platform portion 70 and is non-rotatable relative thereto.

Returning to FIG. 4, the axle 88 has a recessed intermediate portion 90 located between an upper portion 92 and a lower portion 94. In the embodiment illustrated, the recessed intermediate portion 90 extends continuously around the circumference of the axle 88. The upper and lower portions 92 and 94 each have a larger diameter than the recessed intermediate portion 90. Thus, the recessed intermediate portion 90 has a generally I-shaped cross-sectional shape.

Figure 9:
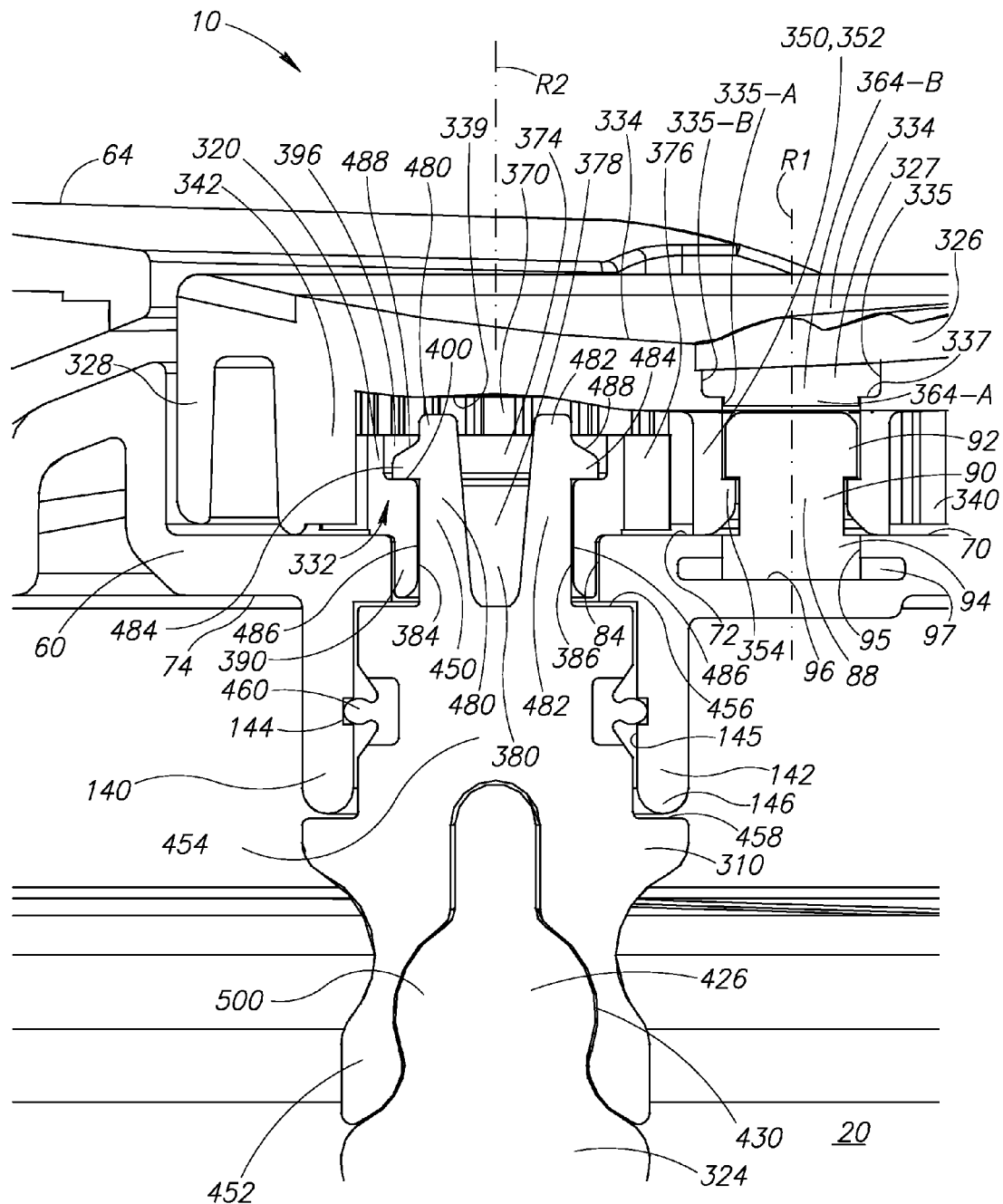
FIG. 9 is an enlargement of a central portion of FIG. 8.

The support platform portion 70 has an opening 95 into which the axle 88 is inserted as a separate component. Turning to FIG. 9, the opening 95 has a bottom support surface 96 for supporting the axle 88 and an undercut portion 97 adjacent the axle when the axle is received inside the opening. The undercut portion 97 extends outwardly below the upper surface 72 of the support platform portion 70. An adhesive (not shown) may be disposed between the axle 88 and the bottom support surface 96 to affix the axle inside the opening 95. Excess adhesive that is squeezed from between the axle 88 and the bottom support surface 96 may be received into the undercut portion 97.

Alternatively, the axle 88 may be formed as an integral component of the lid body 60. The invention is not limited by the method used to form the axle 88 or couple it to the support platform portion 70. Further, the axle 88 may be removably or non-removably coupled to the support platform portion 70.

Returning to FIG. 4, a curved guide wall 98 spaced inwardly from the perimeter portion "P2" extends upwardly from the upper surface 72 of the support platform portion 70. The curved guide wall 98 may help limit the lateral movement of the wheel 80 (see FIG. 7) relative to the support platform portion 70.

Adjacent the support platform portion 70, the lid body 60 includes a generally crescent shaped drinking area 100 bordered along the perimeter "P1" of the lid body 60 by a continuous inwardly facing surface 102 of a continuous upwardly extending sidewall 106 terminated by an upper edge portion 110. The sidewall 106 has an outwardly facing surface 108 opposite the inwardly facing surface 102. The drinking area 100 includes an upwardly facing bottom surface 112 that slopes downwardly toward a drinking aperture 116. The upper edge portion 110 of the sidewall 106 includes a relieved portion 111 adjacent the drinking aperture 116 in fluid communication with the interior portion 20 of the vessel 14. The relieved portion 111 may be configured to be received between the lips of the user.

Figure 5:
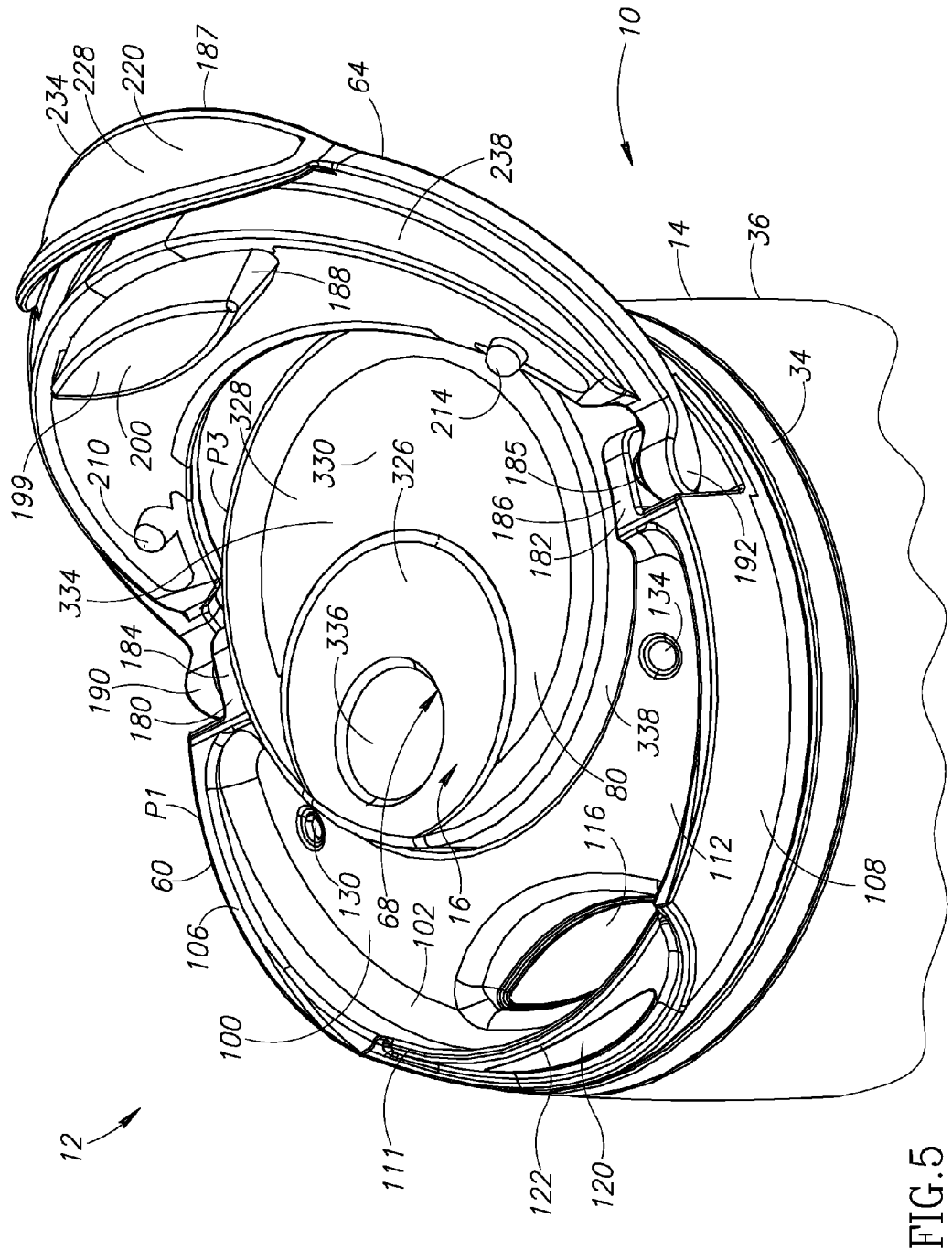
FIG. 5 is an enlarged fragmentary perspective view of the container of FIG. 1 illustrated with a movable cover portion of its lid in an open position.
Figure 8:
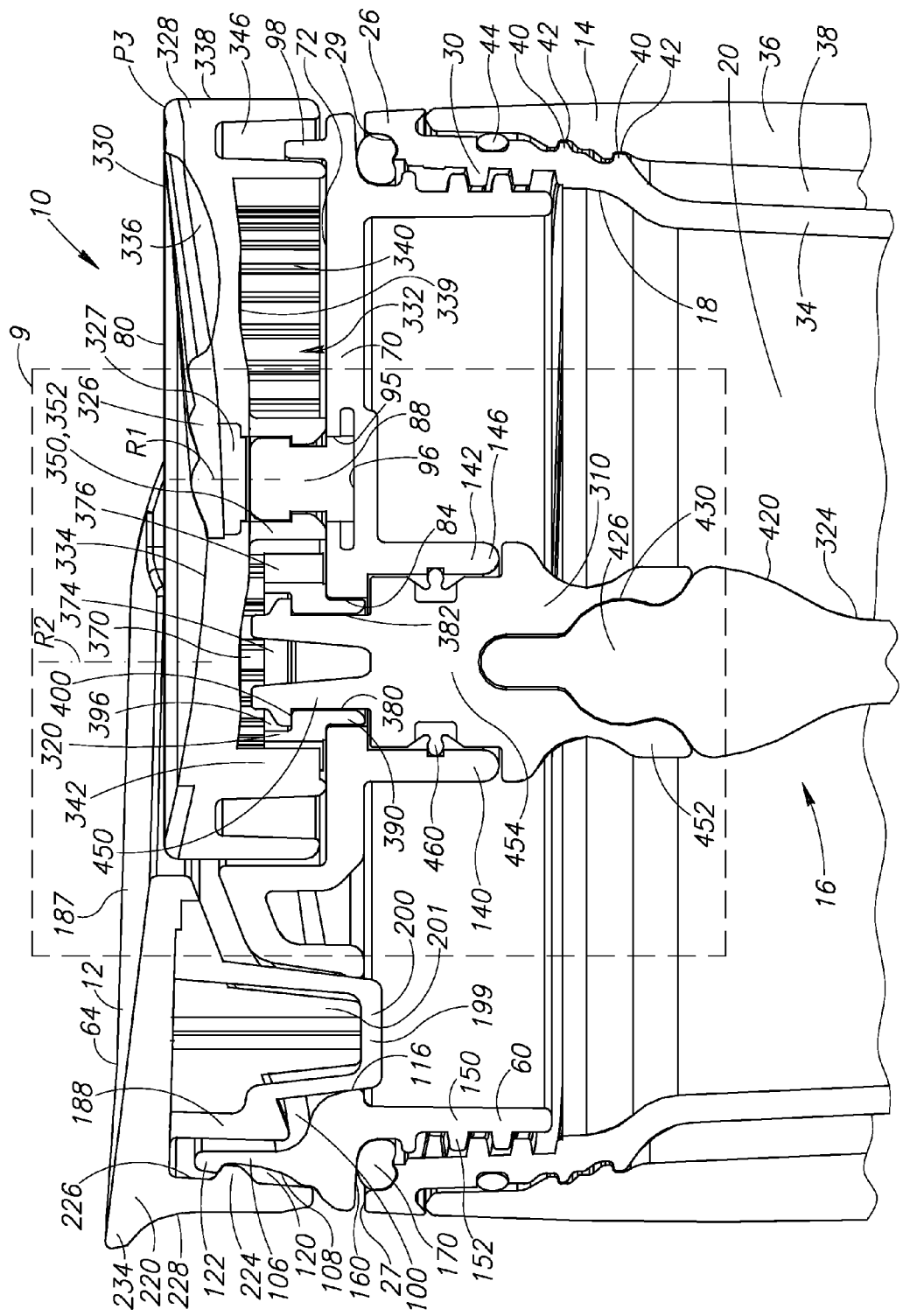
FIG. 8 is an enlarged fragmentary cross-sectional view of the container of FIG. 1.

Turning to FIGS. 5 and 8, a recessed portion 120 having an outwardly extending projection 122 is formed in the outwardly facing surface 108 of the sidewall 106 adjacent the drinking aperture 116. The recessed portion 120 may be shaped to receive a portion of the lower lip of the user of the container 10. The drinking aperture 116 provides an outlet through which the contents 22 (see FIG. 1) of the vessel 14 may exit the vessel when the lid 12 is coupled to the vessel, the movable cover portion 64 is in the open position (as illustrated in FIG. 5), and the vessel is tipped sufficiently to cause its contents to flow along the inside surface 18 (see FIG. 1) of the vessel, out the drinking aperture 116, and into the drinking area 100.

Referring to FIG. 5, one or more airflow apertures (e.g., an airflow aperture 130) may be formed in the bottom surface 112 of the drinking area 100. The airflow aperture 130 may provide an airway through which air may enter the interior portion 20 (see FIG. 1) of the vessel 14 when the contents of the vessel are poured therefrom through the drinking aperture 116. Optionally, one or more dimples or depressions (e.g., a depression 134) may be formed in the bottom surface 112 of the drinking area 100.

Figure 6:
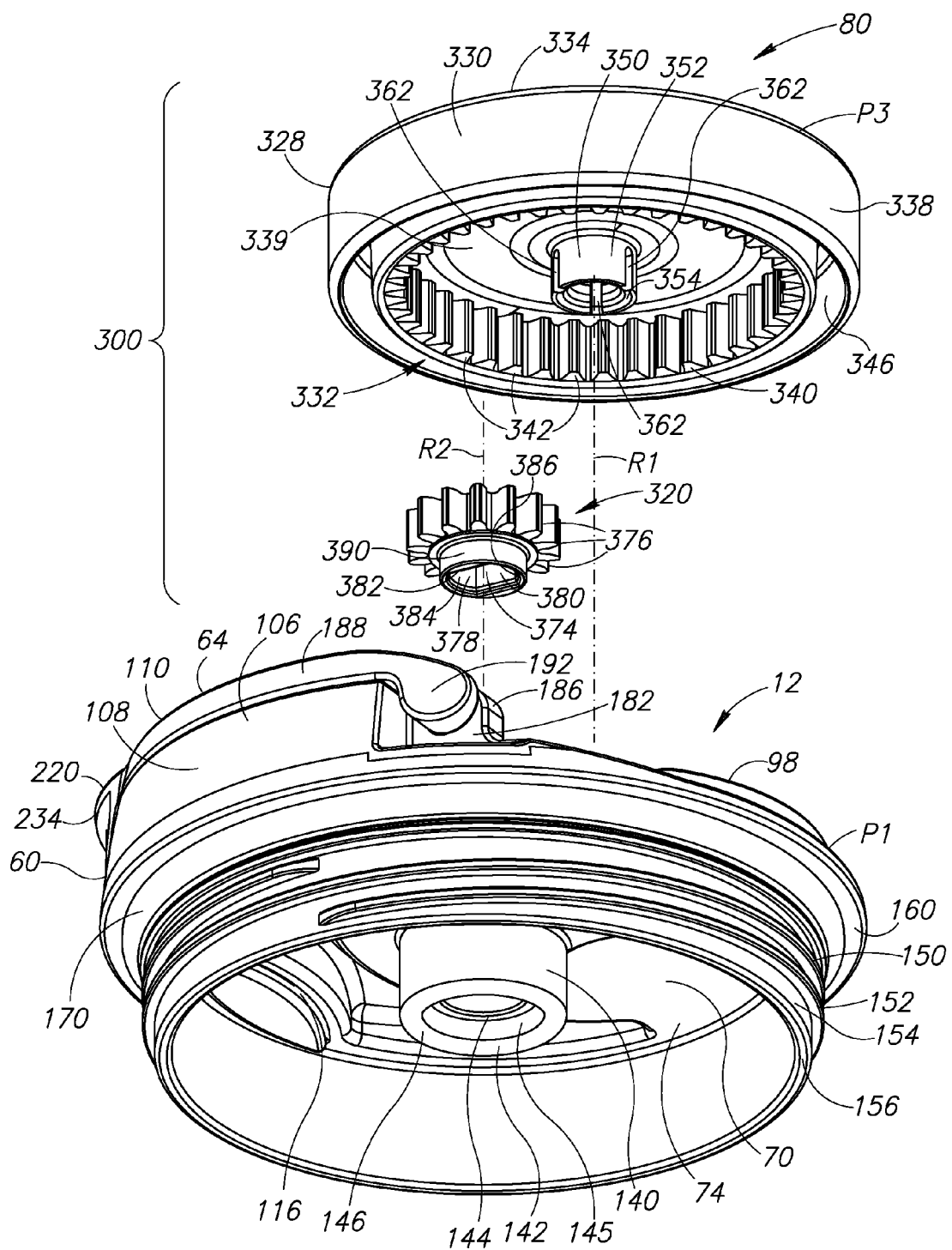
FIG. 6 is a partially exploded perspective view of the lid and external components of a stirring assembly as viewed from underneath the lid.

Turning to FIG. 6 where the underside of the lid body 60 is illustrated, the lid body 60 includes a housing 140 having an annular sidewall 142 with a lower edge portion 146. The sidewall 142 extends downwardly from the bottom surface 74 of the support platform portion 70 and is centered about and spaced apart from the through-hole 84 (see FIG. 4). A circumferentially extending groove 144 may be formed on an inside surface 145 of the annular sidewall 142.

The lid body 60 is removably couplable to the rim portion 26 (see FIGS. 2 and 3) of the vessel 14 by a connector portion 150. The connector portion 150 of the lid body 60 includes outside threads 152 disposed about an outwardly facing surface 154 of a downwardly extending annular sidewall 156 that is spaced inwardly from the perimeter portion "P1" of the lid body 60. The outside threads 152 of the connector portion 150 are configured to threadedly engage the inside threads 30 (see FIG. 3) of the rim portion 26 (see FIG. 3) for removable engagement therewith.

An overhang portion 160 located outside the downwardly extending annular sidewall 156 is disposed along the perimeter portion "P1" of the lid body 60. When the lid body 60 is coupled to the rim portion 26 (see FIGS. 2 and 3) of the vessel 14, the overhang portion 160 is adjacent the upper edge portion 27 (see FIG. 3) of the rim portion.

As may be viewed in FIGS. 1 and 8, an annular sealing member 170 (e.g., an O-ring) may be disposed in the groove 29. When the lid body 60 is coupled to the rim portion 26 of the vessel 14, the annular sealing member 170 is positioned adjacent the overhang portion 160 and is compressed thereby to form a liquid tight seal between the overhang portion 160 and the upper edge portion 27 of the rim portion 26.

Turning to FIG. 4, the lid body 60 includes a pair of spaced apart connector portions 180 and 182. The connector portions 180 and 182 pivotally couple the movable cover portion 64 to the lid body 60. In the embodiment illustrated, the connector portions 180 and 182 are implemented as a pair of spaced apart upwardly extending wall sections 184 and 186, respectively, spaced inwardly from the perimeter portion "P1" of the lid body 60. The wall sections 184 and 186 illustrated in the figures extend linearly and are substantially parallel to one another. Each of the wall sections 184 and 186 includes a transverse through-hole 185 extending therethough.

Turning now to the movable cover portion 64, the movable cover portion 64 may be constructed from an outer shell portion 187 and an inner shell portion 188. The outer shell portion 187 may be constructed from a rigid wear resistant material and the inner shell portion 188 may be constructed from a compressible sealing material. The outer and inner shell portions 187 and 188 may be constructed and assembled together using any method known in the art. For example, the outer and inner shell portions 187 and 188 may be glued together. By way of another non-limiting example, the inner shell portion 188 may be molded over the outer shell portion 187. Further, the inner shell portion 188 may snapped into the outer shell portion 187. The various components of the movable cover portion 64 described below may be formed in either the outer and inner shell portions 187 and 188 or both of the outer and inner shell portions 187 and 188. Therefore, a distinction is not made as to whether a particular component is formed in the outer shell portion 187 or the inner shell portion 188. Further, implementations in which the movable cover portion 64 is constructed as a single unitary shell are also within the scope of the present teachings.

The movable cover portion 64 includes connector portions 190 and 192 configured to couple with connector portions 180 and 182, respectively, of the lid body 60. In the embodiment illustrated, the connector portions 190 and 192 are formed in the outer shell portion 187 of the movable cover portion 64 and each include an inwardly extending pivot pin 196. When the container 10 (see FIGS. 1, 5, and 8) is assembled, the pivot pin 196 of each of the connector portions 190 and 192 extends into the transverse through-hole 185 of the connector portions 180 and 182, respectively, to pivotably couple the connector portions 190 and 192 of the movable cover portion 64 to the connector portions 180 and 182 (see FIGS. 3 and 4) of the lid body 60, respectively.

The connector portions 180 and 182 and the connector portions 190 and 192 are configured to allow the movable cover portion 64 to be selectively pivoted manually between the open (illustrated in FIG. 5) and the closed (illustrated in FIGS. 1 and 6-8) positions relative to the lid body 60. In the embodiment illustrated, the movable cover portion 64 pivots on the pivot pins 196 of the connector portions 190 and 192 within the transverse through-holes 185 of the connector portions 180 and 182, respectively, relative to the lid body 60.

In the closed position (illustrated in FIGS. 1 and 6-8), the movable cover portion 64 is adjacent to and encloses the drinking area 100 forming a liquid tight seal therewith. In the open position, the movable cover portion 64 is spaced from the drinking area 100 allowing access to the drinking area 100 from outside the container 10. When the movable cover portion 64 is in the open position and the vessel 14 (see FIG. 1) is tipped sufficiently, the contents 22 (see FIG. 1) of the vessel 14 may flow through the drinking aperture 116 and out of the drinking area 100.

Turning to FIGS. 5 and 8, the movable cover portion 64 includes a downwardly extending plug portion 200 configured to be received inside the drinking aperture 116 when the movable cover portion 64 is in the closed position. In the embodiment illustrated in FIG. 8, an outer portion 199 of the plug portion 200 is formed in the inner shell portion 188 of the movable cover portion 64 and an inner portion 201 of the plug portion 200 is formed in the outer shell portion 187 of the movable cover portion 64. The plug portion 200 seals the drinking aperture 116 to limit the flow the contents 22 (see FIG. 1) from the vessel 14 into the drinking area 100. The outer portion 199 of the plug portion 200 may be constructed from a compressible material that is compressed inside the drinking aperture 116 to form a liquid tight seal when the movable cover portion 64 is in the closed position.

Referring to FIG. 5, optionally, the movable cover portion 64 may include a downwardly extending plug portion 210 that extends into the airflow aperture 130 when the movable cover portion 64 is in the closed position. As may best be viewed in FIG. 4, in the embodiment illustrated, an outer portion 209 of the plug portion 210 is formed in the inner shell portion 188 of the movable cover portion 64 and an inner portion 211 of the plug portion 210 is formed in the outer shell portion 187 of the movable cover portion 64. If the drinking area 100 includes more than one airflow aperture 130, the movable cover portion 64 may include a downwardly extending plug portion for each airflow aperture. However, this is not a requirement. The plug portion 210 may limit the flow of the contents 22 (see FIG. 1) of the vessel 14 (see FIG. 1) into the enclosed drinking area 100 when the container 10 (see FIG. 1) is assembled and the movable cover portion 64 is in the closed position.

Returning to FIG. 5, optionally, the movable cover portion 64 may include a downwardly extending positioning projection 214 that extends into the depression 134 when the movable cover portion 64 is in the closed position. The projection 214 may be formed in the inner shell portion 188 of the movable cover portion 64. Alternatively, an outer portion (not shown) of the positioning projection 214 may be formed in the inner shell portion 188 of the movable cover portion 64 and an inner portion (not shown) of the positioning projection 214 may be formed in the outer shell portion 187 of the movable cover portion 64. If the drinking area 100 includes more than one depression 134, the movable cover portion 64 may include a downwardly extending positioning projection like the positioning projection 214 for each depression. However, this is not a requirement. The positioning projection 214 may help guide the movable cover portion 64 into proper alignment with the lid body 60 as the movable cover portion transitions from the open position (illustrated in FIG. 5) to the closed position (illustrated in FIGS. 1 and 6-8).

Figure 10:
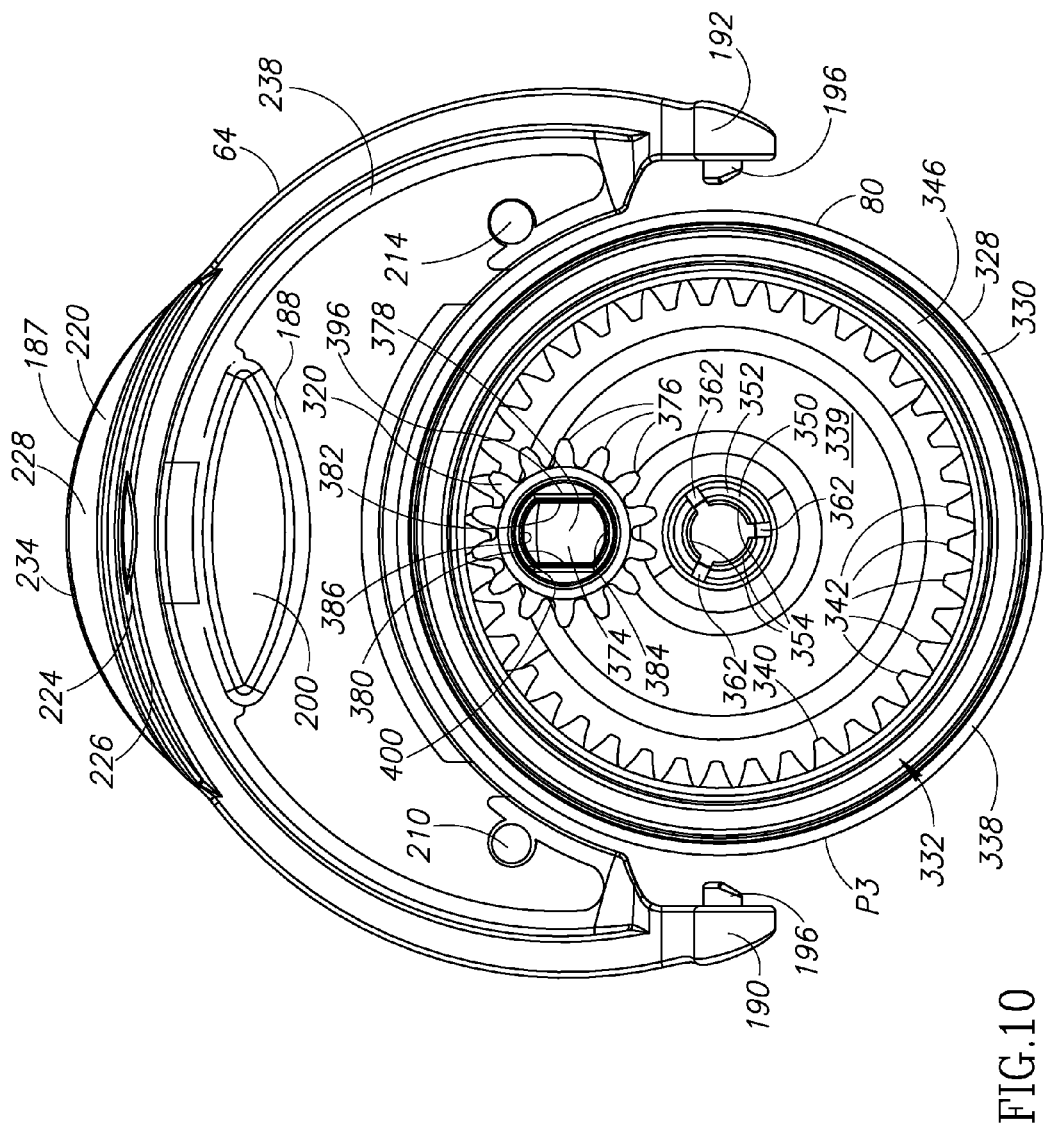
FIG. 10 is a view of the underside of the movable cover portion of the lid and the external components of the stirring assembly.

Referring to FIGS. 8 and 10, the movable cover portion 64 includes a latch portion 220. In the embodiment illustrated, the latch portion 220 is formed in the outer shell portion 187 of the movable cover portion 64. The latch portion 220 helps maintain the movable cover portion 64 in the closed position. The latch portion 220 includes an inwardly extending projection 224 formed on an inwardly facing surface 226 of a downwardly extending cantilevered portion 228. Turning to FIG. 8, when the movable cover portion 64 is pivoted toward the closed position (from the open position), the inwardly extending projection 224 encounters the outwardly extending projection 122 formed in the recessed portion 120 of the outwardly facing surface 108 of the sidewall 106 of the lid body 60. Additional downwardly directed force on the movable cover portion 64 will cause the cantilevered portion 228 to deflect outwardly allowing the inwardly extending projection 224 to traverse the outwardly extending projection 122. Then, the cantilevered portion 228 returns to its original (non-deflected) configuration positioning the inwardly extending projection 224 below the outwardly extending projection 122.

To pivot the movable cover portion 64 from the closed position to the open position, an upwardly directed force must be applied to the movable cover portion 64. The upwardly directed force causes the inwardly extending projection 224 to encounter the underside of the outwardly extending projection 122 formed in the recessed portion 120 of the outwardly facing surface 108 of the sidewall 106 of the lid body 60. Additional upwardly directed force causes the cantilevered portion 228 to deflect outwardly to allow the inwardly extending projection 224 to traverse the outwardly extending projection 122.

Optionally, the movable cover portion 64 includes an outwardly extending gripping portion 234. In the embodiment illustrated, the gripping portion 234 is formed in the outer shell portion 187 of the movable cover portion 64. A user may apply an upwardly directed force to the gripping portion 234 to transition the movable cover portion 64 from the closed to the open position. In the embodiment illustrated, the gripping portion 234 is coupled to the upper portion of the cantilevered portion 228 and oriented such that the upwardly directed force applied to the gripping portion 234 rotates the cantilevered portion 228 of the latch portion 220 away from the sidewall 106 of the lid body 60, thus reducing the amount of upwardly directed force required to cause the cantilevered portion 228 to deflect enough to allow the inwardly extending projection 224 to traverse the outwardly extending projection 122. In other words, the gripping portion 234 may be positioned such an upwardly directed force applied to the gripping portion 234 is translated thereby into an angularly directed force that pulls the lower portion of the cantilevered portion 228 away from the sidewall 106 of the lid body 60. As is appreciated by those of ordinary skill in the art, such a configuration causes other portions of the movable cover portion 64 adjacent the gripping portion 234 to compress or deflect.

Returning to FIG. 5, optionally, the movable cover portion 64 includes an inwardly extending sidewall 238 that extends inside the continuous sidewall 106 bordering the drinking area 100 along the perimeter "P1" of the lid body 60 when the movable cover portion 64 is in the closed position. In the embodiment illustrated, the sidewall 238 is formed in the outer shell portion 187 of the movable cover portion 64 and the inner shell portion 188 is positioned adjacent to and inward of the sidewall 238. The inner shell portion 188 of the movable cover portion 64 may extend along the inside surface of the sidewall 238.

Stirring Assembly

Returning to FIG. 1, the stirring assembly 16 is used to stir or agitate the contents 22 of the container 10. Therefore, the container 10 may be particularly useful for contents that tend to separate into two or more components where the stirring assembly 16 may be used to reintegrate the two or more components after they have separated. Similarly, the container 10 may be particularly useful for contents that have a particulate component temporarily maintained in suspension in a liquid component where the stirring assembly 16 may be used to help maintain the particulate component in suspension in the liquid component. By way of a non-limiting example, the container 10 may be particularly useful for hot chocolate, coffee drinks, and the like.

Referring to FIG. 2, the stirring assembly 16 includes external components 300 coupled to internal components 302 by a connector member 310. The external components 300 include components of the stirring assembly 16 positioned above the lid body 60 and the internal components 302 include components of the stirring assembly 16 positioned below the support platform portion 70 and in communication with the contents 22 (see FIG. 1) of the vessel 14.

The external components 300 include the rotatable wheel 80 graspable by the user from outside the container 10, and an external driven gear 320. The internal components 302 include one or more stirring members or paddles 322 mounted on a rotatable shaft 324 that is couplable to the rotatable connector member 310. As will be explained below, the connector member 310 is couplable to the external driven gear 320 for rotation thereby. Rotating the rotatable connector member 310 causes the rotatable shaft 324 coupled thereto to rotate, which in turn rotates the paddles 322 within the contents 22 of the container 10 stirring them.

Figure 11:
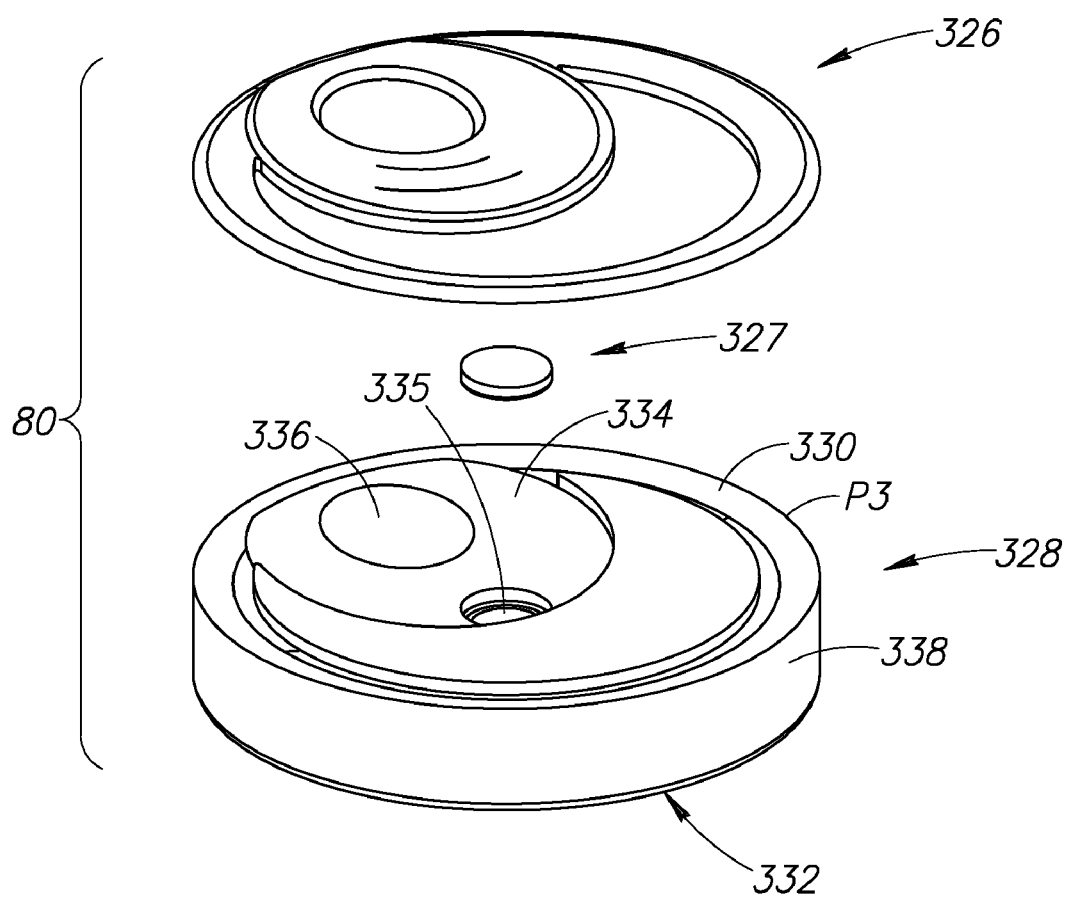
FIG. 11 is an exploded perspective view of a rotatable wheel of the external components of the stirring assembly.

As may best be viewed in FIG. 11, the rotatable wheel 80 may be constructed from an upper surface cover 326, a stopper 327, and a wheel body 328. The wheel body 328 has an outside portion 330 opposite an inside portion 332. The outside portion 330 is configured to be graspable by a user.

In the embodiment illustrated, the outside portion 330 includes an upper contoured surface 334 having an opening 335 formed therein. As may best be viewed in FIG. 9, the opening 335 has a narrowed lower portion 335-A adjacent a wider upper portion 335-B. A shoulder 337 is formed at the intersection of the upper and lower portions 335-A and 335-B of the opening 335.

Returning to FIG. 11, optionally, the outside portion 330 may include a recess 336 formed in the upper contoured surface 334 and configured to receive one of the user's fingers. The user may use the recess 336 to engage and rotate the wheel 80. The outside portion 330 also includes a continuous sidewall 338 extending downwardly from the upper contoured surface 334 along its perimeter portion "P3." The user may also rotate the wheel 80 by exerting a rotational force on a portion of the sidewall 338.

Turning to FIGS. 6 and 10, the inside portion 332 of the wheel body 328 includes a bottom surface 339 opposite the upper contoured surface 334 (see FIG. 11). An internal drive gear 340 having a plurality of radially inwardly extending teeth 342 is adjacent the bottom surface 339 and spaced inwardly from the continuous sidewall 338. The internal drive gear 340 rotates about the rotational axis "R1" (see FIG. 7) defined by the axle 88 (see FIG. 7). A continuous internal annular channel 346 is defined between the continuous sidewall 338 and the internal drive gear 340. When the wheel body 328 is disposed on the lid body 60, the curved guide wall 98 is received inside the channel 346.

A sleeve 350 configured to receive the axle 88 (see FIG. 7) extends downwardly from the bottom surface 339. The sleeve 350 includes a generally cylindrically shaped discontinuous sidewall 352 having an inwardly radially extending annular projection 354. Referring FIG. 9, the projection 354 is configured to be received inside the recessed intermediate portion 90 of the axle 88 below the upper portion 92, the upper portion preventing disengagement of the projection 354 from the recessed intermediate portion 90 and maintaining the wheel body 328 on the axle 88. Thus, the wheel body 328 may be snap fit onto the axle 88. When the projection 354 is received inside the recessed intermediate portion 90 of the axle 88, a lower edge portion of the discontinuous sidewall 352 may rest upon the upper surface 72 of the support platform portion 70.

Returning to FIGS. 6 and 10, the discontinuous sidewall 352 also includes one or more longitudinally extending circumferentially spaced apart cut-out portions 362. The cut-out portions 362 may allow the sidewall 352 to deflect when receiving the axle 88 (see FIG. 9) to allow the projection 354 to traverse the upper portion 92 (see FIG. 9) of the axle 88 before entering the recessed intermediate portion 90.

Referring to FIG. 11, the stopper 327 may be generally disk-shaped and receivable inside the opening 335 formed in the upper contoured surface 334 of the wheel body 328. As may best be viewed in FIG. 9, the stopper 327 has a relieved lower portion 364-A adjacent an upper portion 364-B. When the stopper 327 is received inside the opening 335, the relieved lower portion 364-A of the stopper 327 is received inside the narrowed lower portion 335-A of the opening 335 and the upper portion 364-B of the stopper 327 is received inside the upper portion 335-B of the opening 335. The shoulder 337 prevents the upper portion 364-B of the stopper 327 from entering the narrowed lower portion 335-A of the opening 335.

Returning to FIG. 11, the upper surface cover 326 is disposed on and covers at least a portion of the upper contoured surface 334 of the wheel body 328. For example, the upper surface cover 326 may cover a portion of the upper contoured surface 334 around the recess 336. Further, the upper surface cover 326 may be contoured to follow the contours of the portion of the upper contoured surface 334 covered by the upper surface cover 326. The upper surface cover 326 may cover the opening 335 so that when the stopper 327 is inserted in the opening 335, the upper surface cover 326 prevents removal of the stopper 327 therefrom. The upper surface cover 326 may be constructed from a grippable material having a higher coefficient of friction than the upper contoured surface 334 of the wheel body 328. However, this is not a requirement.

The upper surface cover 326 and the wheel body 328 may be constructed and assembled together using any method known in the art. For example, the upper surface cover 326 may be glued to the upper contoured surface 334 of the wheel body 328. By way of another non-limiting example, the upper surface cover 326 may be molded over the upper contoured surface 334 of the wheel body 328. Further, the upper surface cover 326 may snapped onto the upper contoured surface 334 of the wheel body 328.

Turning to FIG. 9, a void or gap 370 is defined between the internal drive gear 340, the sleeve 350, the bottom surface 339 of the inside portion 332 of the wheel body 328, and the upper surface 72 of the support platform portion 70. When the container 10 is fully assembled, the external driven gear 320 is positioned inside the gap 370.

Turning to FIGS. 6 and 10, the external driven gear 320 has a central portion 374, a plurality of radially outwardly extending teeth 376, and a centrally located slot 378. The plurality of outwardly extending teeth 376 are configured to mesh with the inwardly extending teeth 342 of the internal drive gear 340 of the wheel 80. Thus, when the internal drive gear 340 is rotated, rotational force is transferred to the external driven gear 320 causing it to rotate about a rotational axis "R2" passing through the central portion 374. The slot 378 is defined between a pair of spaced apart internally confronting and substantially parallel stop walls 380 and 382. Along opposite internal portions of the slot 378, the stop walls 380 and 382 are connected by a first curved sidewall 384 and a second curved sidewall 386.

Turning to FIG. 9, the external driven gear 320 and the rotational axis "R2" are centered about the through-hole 84 formed in the lid body 60. In the embodiment illustrated, the external driven gear 320 includes a downwardly extending collar portion 390 configured to be received inside the through-hole 84 and rotate therein. When received inside the through-hole 84, the collar portion 390 helps limit lateral movement of the external driven gear 320 relative to the support platform portion 70.

Turning to FIG. 7, the external driven gear 320 includes an upper recessed portion 396 formed in its central portion 374 opposite the downwardly extending collar portion 390. The upper recessed portion 396 is contiguous with the centrally located slot 378. Turning to FIG. 10, a shoulder 400 is formed at the intersection of the upper recessed portion 396 with the curved sidewalls 384 and 386 and the stop walls 380 and 382 of the slot 378.

Turning now to the internal components 302 of the stirring assembly 16 as illustrated in FIG. 1, the paddles 322 are arranged about the rotatable shaft 324 and extend outwardly therefrom at angles that help facilitate stirring the contents 22 of the container 10. By way of a non-limiting example, the paddles 322 may be arranged in a helical pattern along the shaft 324. Further, the paddles 322 may be angled slightly upwardly. The paddles 322 each have a surface area and in the embodiment illustrated, the surface areas of the paddles 322 increase along the length of the rotatable shaft 324 away from the lid 12. Further, the paddles 322 illustrated have been given a pleasing rounded shape. However, this is not a requirement. The paddles 322 mounted on the rotatable shaft 324 may be configured in any manner desired. Methods of constructing paddles and similar stirring elements are well known in the art and will not be described in detail. The invention is not limited by the shape or configuration of the paddles 322 attached to the shaft 324. The paddles 322 may be constructed from any material known in the art as suitable for food applications and capable of withstanding the shear forces encountered by the paddles when rotated within the contents of the vessel 14.

As mentioned above, particulate components of the contents 22 held in suspension in a liquid component of the contents 22 may settle from the liquid component and reside in the bottom portion 24 and at least a portion of the settled particulate components may rest upon a portion of the inside surface 18 adjacent the bottom portion 24 of the hollow interior portion 20 of the vessel 14. The paddles 322 may include a bottommost paddle 410 adjacent the bottom portion 24 of the hollow interior portion 20 of the vessel 14. The paddle 410 may be configured to conform to the shape of the bottom portion 24 of the hollow interior portion 20 of the vessel 14. When the user operates the stirring assembly 16 to agitate the contents 22 to suspend the settled particulate components in the liquid component, the paddle 410 may move adjacently to the portion of the inside surface 18 adjacent the bottom portion 24 to agitate (or stir) the settled particulate components.

The rotatable shaft 324 is generally elongated and extends from the rotatable connector member 310 into the hollow interior portion 20 of the vessel 14. The shaft 324 has a proximal end portion 420 opposite a free distal end portion 422 adjacent the bottom portion 24 of the hollow interior portion 20 of the vessel 14.

Figure 12:
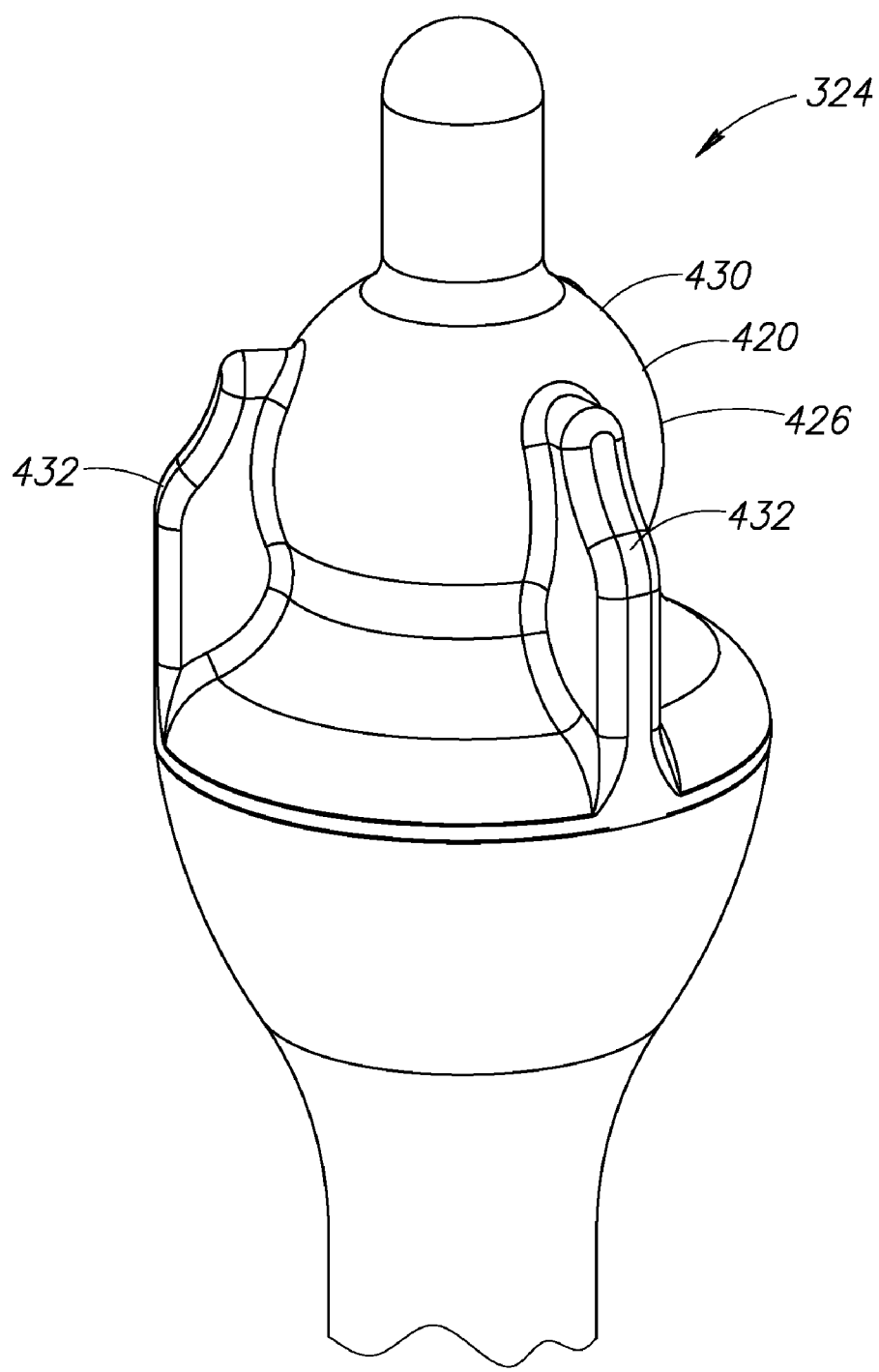
FIG. 12 is an enlarged perspective view of a proximal connector portion of an internal rotatable shaft of the stirring assembly.

Referring to FIG. 12, at its proximal end portion 420, the shaft 324 has a connector portion 426 configured to couple with the rotatable connector member 310 (see FIG. 13) to form a non-rotatable connection between the shaft 324 and the rotatable connector member 310. Thus, when the rotatable connector member 310 is rotated, the shaft 324 rotates therewith. The shaft 324 and the connector member 310 are aligned along the rotational axis "R2" and rotate thereabout. The connector portion 426 includes a key portion 430 and a plurality of outwardly radially extending fins 432.

Figure 13:
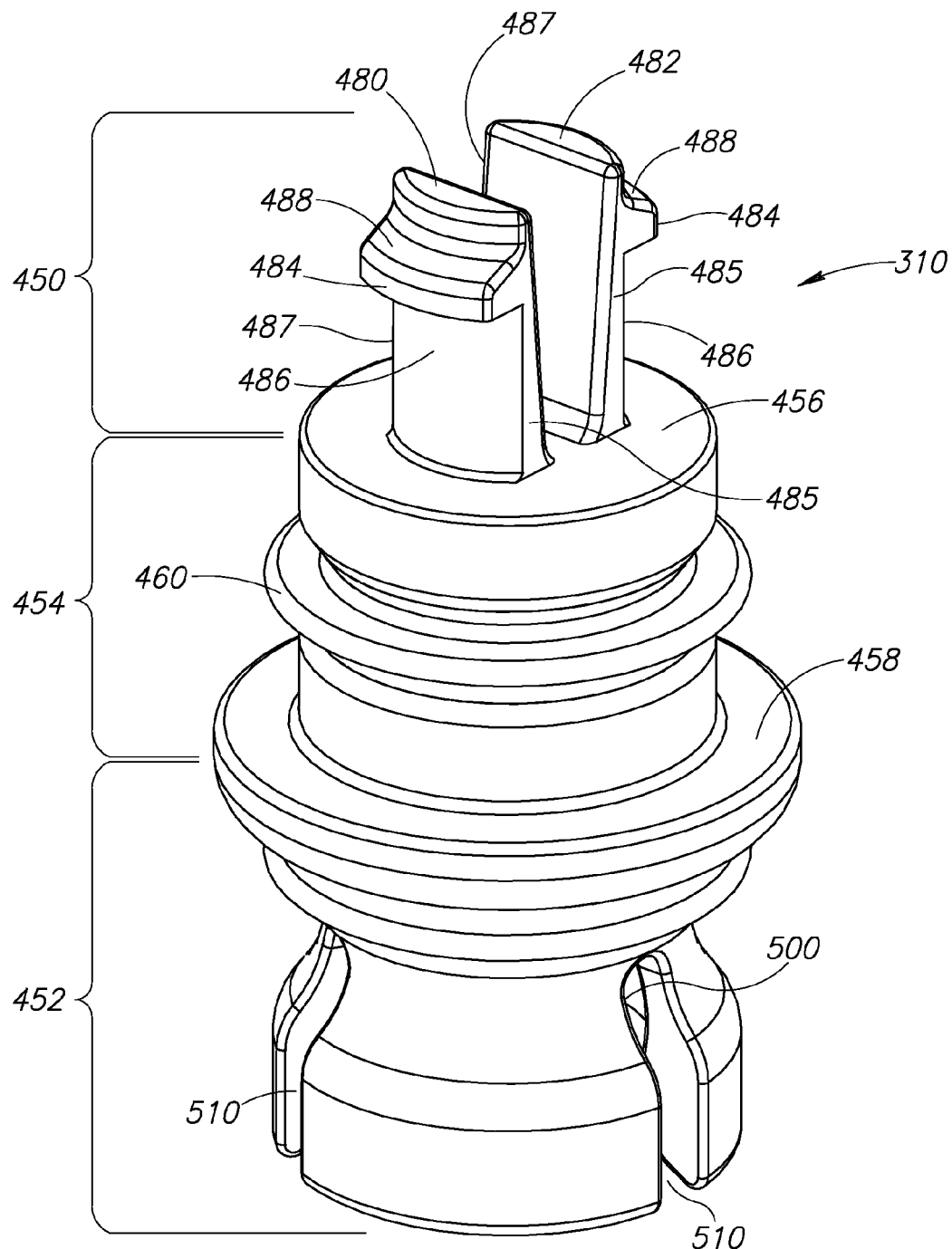
FIG. 13 is an enlarged perspective view of a rotatable connector member of the stirring assembly.

As may best be viewed in FIG. 13, the rotatable connector member 310 has a proximal portion 450, a distal portion 452 opposite the proximal portion, and an intermediate portion 454 located between the distal and proximal portions. A proximal shoulder 456 is located at the intersection of the proximal and intermediate portions 450 and 454 and a distal shoulder 458 is located at the intersection of the intermediate and distal portions 454 and 452.

Referring to FIG. 9, when the rotatable connector member 310 is assembled with the lid body 60, the proximal shoulder 456 abuts a portion of the bottom surface 74 of the support platform portion 70 located inside the housing 140. The proximal shoulder 456 is configured to prevent the intermediate portion 454 from entering the through-hole 84 formed in the support platform portion 70. The proximal portion 450 of the rotatable connector member 310 extends upwardly from the proximal shoulder 456 and through the through-hole 84 formed in the support platform portion 70. The distal shoulder 458 abuts the lower edge portion 146 of the annular sidewall 142 of the housing 140. The distal shoulder 458 is configured to prevent the distal portion 452 from entering the housing 140. The distal portion 452 extends downwardly from the distal shoulder 458 and is located inside the hollow interior portion 20 of the vessel 14 (see FIG. 1). The intermediate portion 454, which extends between the proximal and distal shoulders 456 and 458, is positioned inside the housing 140.

Optionally, the intermediate portion 454 includes an annular sealing member 460 that forms a liquid tight seal between the intermediate portion 454 and the annular sidewall 142 of the housing 140. In embodiments in which the groove 144 is formed in the inside surface 145 of the sidewall 142 of the housing 140, when the rotatable connector member 310 is assembled with the lid body 60, the annular sealing member 460 may be received inside the groove 144. By way of non-limiting example, the annular sealing member 460 may be constructed by overmolding the annular sealing member over the intermediate portion 454.

Returning to FIG. 13, the proximal portion 450 of the connector member 310 includes a pair of upright spaced apart elongated fingers 480 and 482. The fingers 480 and 482 each include a projection 484 extending outwardly from a curved longitudinally extending outside surface 486. The outside surface 486 of each of the fingers 480 and 482 extends between a pair of opposing outer surfaces 485 and 487. In the embodiment illustrated, the outer surfaces 485 and 487 are substantially planar and parallel.

The projection 484 has an upper surface 488 that tapers downwardly away from the outside surface 486. The fingers 480 and 482 are configured to deflect inwardly when an inwardly directed lateral force is applied to the projections 484. The fingers 480 and 482 are further configured to return to their original non-deflected configuration in the absence of the inwardly directed lateral force.

Turning to FIG. 9, when the container 10 is fully assembled, the fingers 480 and 482 each extend upwardly from the intermediate portion 454, through the through-hole 84 formed in the support platform portion 70. The fingers 480 and 482 further extend up into the centrally located slot 378 of the external driven gear 320 between the curved sidewalls 384 and 386 and the stop walls 380 and 382 with the curved surface 486 of the finger 480 adjacent the curved sidewall 384 and the curved surface 486 of the finger 482 adjacent the curved sidewall 386. The outer surfaces 485 (see FIG. 13) of the fingers 480 and 482 are adjacent the stop wall 380 and the outer surfaces 487 (see FIG. 13) of the fingers 480 and 482 are adjacent the stop wall 382 (see FIGS. 6 and 10). The projections 484 of the fingers 480 and 482 are above and adjacent to the shoulder 400. In the embodiment illustrated, the projections 484 of the fingers 480 and 482 rest upon the shoulder 400.

When the external driven gear 320 is rotated, face-to-face engagement between the outside surfaces 485 (see FIG. 13) of the fingers 480 and 482 and the internal sidewall 380 and face-to-face engagement between the outside surfaces 487 (see FIG. 13) of the fingers 480 and 482 and the internal sidewall 382 (see FIGS. 6 and 10) prevent the rotatable connector member 310 from rotating relative to the external driven gear 320 causing the connector member 310 to rotate with the external driven gear 320. In this manner, the connector member 310 is rotated by the external driven gear 320 about the rotational axis "R2" as the external driven gear 320 rotates about the rotational axis "R2."

As mentioned above, the connector portion 426 of the shaft 324 includes the key portion 430 and the plurality of outwardly radially extending fins 432 (see FIG. 12). The distal portion 452 of the connector member 310 includes a key way portion 500 configured to grip and hold the key portion 430 of the shaft 324. Turning to FIGS. 12 and 13, the distal portion 452 of the connector member 310 also includes a plurality of longitudinally extending slots 510 configured to receive the fins 432 of the connector portion 426 of the shaft 324 when the key portion 430 of the shaft 324 is received by the key way portion 500. Referring to FIG. 1, engagement between the slots 510 and the fins 432 helps prevent rotation of the shaft 324 relative to the connector member 310. Thus, the shaft 324 is rotated by the rotatable connector member 310 when the rotatable connector member 310 is rotated.

Operation

Turning to FIG. 1, the user may open the movable cover portion 64 of the lid 12 by lifting upwardly on its outwardly extending gripping portion 234. The user may close the movable cover portion 64 by pivoting it toward the crescent shaped drinking area 100 (see FIG. 5) and pressing downwardly on the movable cover portion 64 until the inwardly extending projection 224 (see FIG. 8) of the latch portion 220 traverses the outwardly extending projection 122 (see FIG. 8) formed in the sidewall 106 (see FIG. 8) of the lid body 60. To operate the stirring assembly 16, the user may place the movable cover portion 64 in the closed position and rotate the wheel 80 relative to the lid 12. Alternatively, the movable cover portion 64 may be in the open position when the wheel 80 is rotated by the user.

Turning to FIG. 8, applying a rotational force to the wheel 80 causes the internal drive gear 340 of the wheel 80 to rotate about the rotational axis "R1." As the internal drive gear 340 rotates, engagement between its inwardly extending teeth 342 and the outwardly extending teeth 376 of the external driven gear 320 cause the external driven gear 320 to rotate about the rotational axis "R2" passing through its central portion 374. As the external driven gear 320 rotates about the rotational axis "R2," the connector member 310 rotates therewith about the rotational axis "R2." As mentioned above, the connector member 310 is non-rotatable relative to the external driven gear 320. The rotatable shaft 324, which is non-rotatably coupled to the connector member 310, rotates with the connector member 310 about the rotational axis "R2." Returning to FIG. 1, as the shaft 324 rotates, the paddles 322 inside the vessel 14 to rotate and stir the contents 22.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A container comprising:
a vessel having a hollow interior and an upper support platform with a first aperture formed therein;
an external manually rotatable wheel supported by the upper support platform and selectively rotatable about a first axis of rotation relative to the vessel;
a shaft disposed inside the hollow interior of the vessel;
a connector member having a first portion disposed inside the first aperture formed in the upper support platform, a second portion disposed above the upper support platform and coupled to the manually rotatable wheel, and a third portion disposed inside the hollow interior of the vessel and coupled to the shaft, the connector member being rotatable by the manually rotatable wheel when the manually rotatable wheel is rotated about the first axis of rotation, and when rotated by the manually rotatable wheel, the connector member rotating the shaft, the shaft being rotatable about a second axis of rotation when the wheel is selectively rotated about the first axis of rotation, the second axis of rotation being spaced from the first axis of rotation; and
at least one paddle extending outwardly from the shaft into the hollow interior of the vessel, rotation of the shaft rotating the at least one paddle inside the hollow interior of the vessel about the second axis of rotation.

2. The container of claim 1, wherein
an upright axle is non-rotatably mounted on the upper support platform and extends along the first axis of rotation, and
the wheel is rotatably mounted to the axle and is selectively rotatable thereabout.

3. The container of claim 2, wherein
the wheel has an internal gear,
an external gear is rotated by the internal gear of the wheel about the second axis of rotation,
the shaft has a proximal end adjacent the upper support platform, and
the proximal end of the shaft is non-rotatably coupled to the external gear so that rotation of the external gear by the internal gear of the wheel also rotates the shaft.

4. The container of claim 2, wherein the upper support platform of the vessel is disposed on a removable lid.

5. The container of claim 1, wherein
the upper support platform of the vessel is disposed on a removable lid;
an upright axle extends along the first axis of rotation,
the wheel is rotatably mounted to the axle for rotation relative to the lid,
the wheel has an internal gear,
an external gear is rotatable by the internal gear of the wheel about the second axis of rotation,
the shaft has a proximal end adjacent the lid, and the external gear is non-rotatably coupled to the proximal end of the shaft so that rotation of the external gear by the internal gear of the wheel also rotates the shaft.

6. The container of claim 5, wherein the axle is non-rotatably coupled to the lid.

7. The container of claim 1, wherein the upper support platform of the vessel is disposed on a removable lid, the wheel being adjacent the upper surface of the lid, the container further comprising:
   a driven gear adjacent the upper surface of the lid non-rotatably coupled to the shaft; and
   an upright axle non-rotatably mounted to the lid and extending along the first axis of rotation, the wheel being rotatably mounted to the axle and rotatable thereabout, the wheel having a drive gear in driving engagement with the driven gear, the drive gear rotating the driven gear about the second axis of rotation when the drive gear is rotated about the first axis of rotation thereby rotating the shaft about the second axis of rotation.

8. The container of claim 1, wherein the upper support platform has a drinking aperture in communication with the hollow interior of the vessel.

9. The container of claim 8, further comprising:
   a lid coupled to the vessel; and
   a cover pivotally coupled the lid, the cover being selectively transitionable from a closed position and an open position, when in the closed position, the cover blocking access to the drinking aperture, and when in the open position, the cover allowing access to the drinking aperture.

10. The container of claim 9, wherein the cover comprises a plug portion receivable inside the drinking aperture when the cover is in the closed position, the plug portion sealing the drinking aperture when received therein.

11. The container of claim 1 further comprising:
    a lid having a substantially circular shape with an outer perimeter coupled to the vessel, the wheel being disposed on the lid within the outer perimeter.

12. The container of claim 1 for use by a user having a finger, wherein the wheel has a recess configured to receive the user's finger, the wheel being rotatable by a rotational force applied by the user's finger to the inside of the recess.

13. The container of claim 1, wherein the hollow interior of the vessel has a bottom portion and the at least one paddle comprises a bottom paddle adjacent the bottom portion of the hollow interior.

14. The container of claim 1, wherein the hollow interior of the vessel has a bottom portion having an internal shape with a contour and the at least one paddle comprises a bottom paddle adjacent the bottom portion of the hollow interior, the bottom paddle having an external shape with a contour that follows the contour of the internal shape of the bottom portion of the hollow interior of the vessel.

15. The container of claim 1, wherein the at least one paddle comprises a plurality of paddles extending along the shaft.

16. The container of claim 15, wherein the hollow interior of the vessel has a bottom portion and each of plurality of paddles comprises a surface area and the surface areas of the paddles increase along the shaft toward the bottom portion of the hollow interior of the vessel.

17. A stirring assembly for use with a vessel having a hollow interior and an upper support platform with a first aperture formed therein, the stirring assembly comprising:
    an external manually rotatable wheel supported by the upper support platform and selectively rotatable about a first axis of rotation relative to the vessel;
    a shaft disposable inside the vessel;
    a connector member having a first portion disposed inside the first aperture formed in the upper support platform, a second portion disposed above the upper support platform and coupled to the manually rotatable wheel, and a third portion disposed inside the hollow interior of the vessel and coupled to the shaft, the connector member being rotatable by the manually rotatable wheel when the manually rotatable wheel is rotated about the first axis of rotation, and when rotated by the manually rotatable wheel, the connector member rotating the shaft, the shaft being rotatable about a second axis of rotation when the wheel is selectively rotated about the first axis of rotation, the second axis of rotation being spaced from the first axis of rotation; and
    at least one paddle extending outwardly from the shaft, rotation of the shaft rotating the at least one paddle about the second axis of rotation.

18. A kit comprising:
    a vessel having a hollow interior portion;
    a lid couplable to the vessel, the lid having a support surface with a first aperture formed therein;
    a manually rotatable wheel supported by the support surface and rotatably mountable to the lid about a first axis of rotation;
    a shaft having at least one paddle extending laterally outwardly therefrom;
    a drive gear selectively rotatable about the first axis of rotation by rotation of the rotatable wheel;
    a driven gear configured to engage the drive gear and be rotated thereby about a second axis of rotation, the shaft being couplable to the driven gear and rotatable thereby when the driven gear is rotated about the second axis of rotation; and
    a connector member having a first portion disposed inside the first aperture formed in the support surface of the lid, a second portion disposed above the support surface and coupled to the manually rotatable wheel by the driven gear, and a third portion disposed inside the hollow interior of the vessel and coupled to the shaft, the connector member being rotatable by the manually rotatable wheel when the manually rotatable wheel is rotated about the first axis of rotation, and when rotated by the manually rotatable wheel, the connector member rotating the shaft.

19. A container comprising:
    a vessel having a rim portion and a hollow interior;
    a lid couplable to the rim portion of the vessel, the lid having a support surface with a first aperture formed therein;
    a manually rotatable wheel supported by the support surface and selectively rotatable relative thereto about a first axis of rotation;
    a shaft disposed inside the hollow interior of the vessel, the shaft having a plurality of paddle members extending laterally therefrom; and
    a connector member having a first portion disposed inside the first aperture formed in the support surface of the lid, a second portion disposed above the support surface and coupled to the manually rotatable wheel, and a third portion disposed inside the hollow interior of the vessel and coupled to the shaft, the connector member being rotatable by the manually rotatable wheel when the manually rotatable wheel is rotated about the first axis of rotation, and when rotated by the manually rotatable wheel, the connector member rotating the shaft.

20. A container comprising:

a vessel having a hollow interior and an upper opening defined by a rim portion;

a lid couplable to the rim portion of the vessel, the lid having a support surface with a first aperture formed therein;

a manually rotatable wheel supported by the support surface and rotatably mounted to the lid about a first axis of rotation;

a shaft having at least one paddle extending laterally outwardly therefrom; and a connector member having a first portion disposed inside the first aperture formed in the support surface of the lid, a second portion disposed above the support surface and coupled to the manually rotatable wheel, and a third portion disposed inside the hollow interior of the vessel and coupled to the shaft, the connector member being rotatable by the manually rotatable wheel when the manually rotatable wheel is rotated about the first axis of rotation, and when rotated by the manually rotatable wheel, the connector member rotating the shaft.

* * * * *